(12) United States Patent
Tan et al.

(10) Patent No.: US 9,875,130 B2
(45) Date of Patent: Jan. 23, 2018

(54) CUSTOMIZING MIRROR VIRTUAL MACHINE(S)

(71) Applicant: INTERNATIONAL BUSINESS MACHINES CORPORATION, Armonk, NY (US)

(72) Inventors: Shuai Tan, Beijing (CN); De Jun Wang, Beijing (CN); Jin Qiang Wu, Beijing (CN); Qiu Xia Zhao, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 58 days.

(21) Appl. No.: 14/797,543

(22) Filed: Jul. 13, 2015

(65) Prior Publication Data

US 2017/0017509 A1   Jan. 19, 2017

(51) Int. Cl.
*G06F 9/455* (2006.01)
*H04L 29/08* (2006.01)

(52) U.S. Cl.
CPC ...... *G06F 9/45558* (2013.01); *H04L 67/1095* (2013.01); *G06F 2009/45562* (2013.01)

(58) Field of Classification Search
None
See application file for complete search history.

(56) References Cited

U.S. PATENT DOCUMENTS 7,679,640 B2   3/2010   Eshkoli et al.
8,151,263 B1 *   4/2012   Venkitachalam ....... G06F 9/485
                                                        711/162

8,423,733 B1 *   4/2013   Ozdemir ................. G06F 3/067
                                                        711/162

(Continued)

FOREIGN PATENT DOCUMENTS

CN   103295434 A   9/2013
EP   2613302 A1   10/2013

(Continued)

*Primary Examiner* — Emerson Puente
*Assistant Examiner* — Steven Do
(74) *Attorney, Agent, or Firm* — Isaac J. Gooshaw, Esq.; George S. Blasiak, Esq.; Heslin Rothenberg Farley & Mesiti, P.C.

(57) ABSTRACT

Methods, computer program products, and systems are presented. The methods include, for instance: synchronizing, by one or more processor, first virtual machine(s) with a second virtual machine, the synchronizing comprising mirroring first input events to the first virtual machine(s); and customizing, by the one or more processor, the first virtual machine(s), the customizing comprising suspending the synchronizing and facilitating sending of second input events to the first virtual machine(s). In one embodiment, the synchronizing comprises cloning the second virtual machine to create the first virtual machine(s), the cloning comprising initializing the first virtual machine(s), and copying second virtual machine state information to the first virtual machine(s). In another embodiment, the customizing comprises decrementing an available first virtual machine counter, and the synchronizing comprises cloning the second virtual machine to create another first virtual machine responsive to the available first virtual machine counter having a certain value.

20 Claims, 10 Drawing Sheets

(56) References Cited

U.S. PATENT DOCUMENTS

| | | | |
|---|---|---|---|
| 8,606,170 B2 | 12/2013 | Ramo | |
| 8,799,900 B1 * | 8/2014 | Kodorkin | H04N 5/262 |
| | | | 718/1 |
| 2007/0179955 A1 * | 8/2007 | Croft | G06F 3/1415 |
| 2007/0300165 A1 | 12/2007 | Haveliwala | |
| 2011/0066786 A1 * | 3/2011 | Colbert | G06F 9/45558 |
| | | | 711/6 |
| 2013/0252223 A1 | 9/2013 | Jadcherla | |
| 2014/0165060 A1 * | 6/2014 | Muller | G06F 9/5022 |
| | | | 718/1 |

FOREIGN PATENT DOCUMENTS

| | | |
|---|---|---|
| WO | 02007128 A3 | 1/2002 |
| WO | 2013120127 A1 | 8/2013 |

\* cited by examiner

CUSTOMIZING MIRROR VIRTUAL MACHINE(S)

TECHNICAL FIELD

The present disclosure relates to virtualization technologies, including virtual networking and virtual computing, and more particularly to methods, computer program products, and systems for customizing mirror virtual machines of, for example, a demonstration virtual machine.

BACKGROUND

During the course of an educational or training program, it may be desirable for a demonstrator to demonstrate the use of computer based technologies to multiple attendees, for example, knowledge workers attending an educational training program. For example, by making use of computer networking technologies, such training may be conducted remotely, with a demonstrator performing tasks on one computer system in one location, and with the output of the one computer system mirrored or displayed to multiple remote attendees who attend virtually through remote access nodes in remote locations.

Conventional internet-based presentation technologies allow a single demonstrator to control and present a slide show or a computer desktop to multiple remote attendees. In such a case, all attendees will have the same view into a specific application, such as a slide show application, or a specific graphical user interface, such as a desktop, controlled by the demonstrator. The singular demonstrator role may be passed sequentially to various attendees, allowing a limited opportunity for interaction by attendees, on a one-by-one basis.

SUMMARY

The shortcomings of the prior art are overcome, and additional advantages are provided, through the provision, in one aspect, of a method. The method includes, for example, synchronizing, by one or more processor, at least one first virtual machine with a second virtual machine. The synchronizing includes mirroring first input events to the at least one first virtual machine. The method further includes customizing, by the one or more processor, the at least one first virtual machine. The customizing includes suspending the synchronizing and facilitating sending of second input events to the at least one first virtual machine.

In another aspect, a computer program product is provided. The computer program product includes a computer readable storage medium readable by one or more processor and storing instructions for execution by the one or more processor for performing a method. The method includes, for example, synchronizing, by one or more processor, at least one first virtual machine with a second virtual machine. The synchronizing includes mirroring first input events to the at least one first virtual machine. The method further includes customizing, by the one or more processor, the at least one first virtual machine. The customizing includes suspending the synchronizing and facilitating sending of second input events to the at least one first virtual machine.

In a further aspect, a system is provided. The system includes, for instance a memory. In addition, the system includes one or more processor in communication with the memory. Further, the system includes program instructions executable by the one or more processor via the memory to perform a method. The method includes, for example, synchronizing, by one or more processor, at least one first virtual machine with a second virtual machine. The synchronizing includes mirroring first input events to the at least one first virtual machine. The method further includes customizing, by the one or more processor, the at least one first virtual machine. The customizing includes suspending the synchronizing and facilitating sending of second input events to the at least one first virtual machine.

Additional features and advantages are realized through the techniques set forth herein. Other embodiments and aspects are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
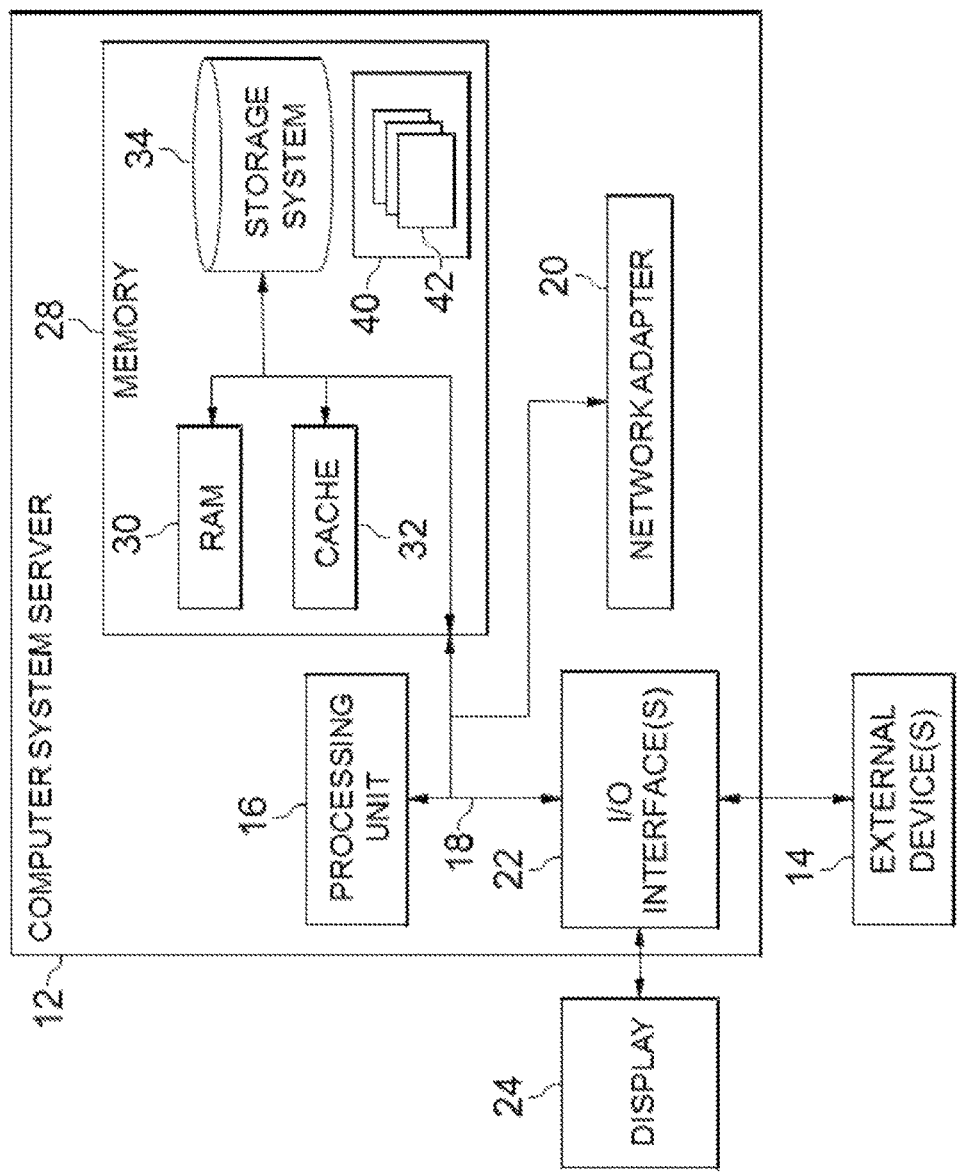
FIG. 1 depicts a cloud computing node according to an embodiment of the present invention.

Aspects of the present disclosure and certain features, advantages, and details thereof, are explained more fully below with reference to the non-limiting examples illustrated in the accompanying drawings. Descriptions of well-known materials, fabrication tools, processing techniques, etc., are omitted so as not to unnecessarily obscure the disclosure in detail. It should be understood, however, that the detailed description and the specific examples, while indicating aspects of the invention, are given by way of illustration only, and not by way of limitation. Various substitutions, modifications, additions, and/or arrangements, within the spirit and/or scope of the underlying inventive concepts will be apparent to those skilled in the art from this disclosure.

The present disclosure provides, in part, methods, computer program products, systems, network devices, and virtual machine management software for synchronizing and/or customizing mirror virtual machines, for example, to provide a new education mechanism, and/or to allow enable attendees of a demonstration or training involving computer technologies to have individual experiences during the demonstration or training.

Typically, during a demonstration or training, such as an educational session in a classroom or online, a host or demonstrator shares output of a computer with attendees. In such a case, all of the attendees non-interactively watch the presentation or demonstration, as the demonstrator shares the output, and shows interactions with the computer environment, including clicking links, copying test or images, etc., in conjunction with training on a computer system, such as a production server.

Unfortunately, such traditional models require all attendees to follow along as a demonstrator shares and explains use of the computer system. This does not meet the needs of attendees who desire to explore other aspects of the computer system, for example loading other files, clicking other links, etc., reducing the overall effectiveness of the demonstration or training, and preventing attendees from acquiring individual experience during the training.

Techniques disclosed herein allow for individual attendees to branch off from a demonstration and follow a different, customized path, without interfering with other attendees who either choose to follow along with the demonstrator or branch off into their own paths. In addition, techniques described herein allow for such an individual attendee to return to the demonstration after finishing a customized path.

In one or more embodiments, cloud based technologies may be used to allow individual attendees using individual attendee computing nodes to either synchronize with a demonstrator or customize a demonstration or training by suspending synchronization and branching off into a mirror virtual machine. For example, a system may be used to conduct education or training by using virtual machine technologies. In such a case, a speaker may operate a meeting virtual machine for the presentations or demonstrations. In one embodiment, a back-end system may synchronize a speaker's operations to other mirror virtual machines, which may be saved in a virtual machine pool. If attendees only want to follow the speaker's demonstration, the attendees can simply share the screen of the speaker's operations, and watch the demonstration.

For example, if attendees would like to explore an idea that is not covered by the speaker, the attendees can each request an individual environment, e.g., a mirror virtual machines, which are synchronized with the speaker's virtual machine up to that point in time. In such a case, the synchronizing can be paused, and each of the attendees can now control their individual mirror virtual machines to conduct any separate operations and/or have individual practice experience with the subject of the demonstration or training. For example, after an attendee has finished individual operation, the attendee can drop such an environment, and return to following the speaker's presentation or demonstration. In addition, the speaker can control the attendees' privileges, and control the number or mirror virtual machines available in the synchronized pool of virtual machines.

In one embodiment, an administrator or speaker may prepare a training/education environment as a "meeting virtual machine" before a class or session begins, and share the meeting virtual machine desktop with all remote attendees. Next, a service virtual machine may be used to provide necessary function for end-user (attendee) sharing, request handling, virtual machine management, and/or synchronization with a back-end. Next, if an end-user wants to have an individual environment, a service virtual machine can give mirror virtual machine connection information to an end-user, stop the synchronization of the meeting virtual machine with the mirror virtual machine, and auto-start-up a remote access client to the mirror virtual machine.

In another embodiment, a virtual machine controller may control the quantity of mirror virtual machines, and if the quantity is lower than a certain configured threshold, the virtual machine controller may initiate a fast clone action to clone some mirror virtual machines from the meeting virtual machines, and synchronize any speaker actions that occur after the cloning. In such a case, the cloned and configured mirror virtual machine can be added to a virtual machine pool, and kept synchronized with events and keyboard/mouse input of the speaker/demonstrator.

In a further embodiment, an overlay network with virtual extensible local area network (VXLAN) technology may be used to isolate meeting virtual machines and mirror virtual machines, to help synchronize keyboard and mouse events, facilitate network and hostname related operations, and support high-availability load balancing.

Advantageously, techniques described herein allow all education and training attendees a chance to operate the same environment (e.g., computer application, operating system, production system, etc.) as the speaker, allowing for enough attendee interaction to ensure robust training outcomes, reducing boredom from lengthy times of sitting and looking by attendees, keeping the attendees' attention and improving learning efficiency. In addition, such techniques may be suitable for remote educational and/or classroom environments, and the host or demonstrator can control the specific parameters, enable or disable individualized learning, etc.

Reference is made below to the drawings, which are not drawn to scale for ease of understanding, wherein the same reference numbers used throughout different figures designate the same or similar components.

FIGS. 1-4 depict various aspects of computing, including cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
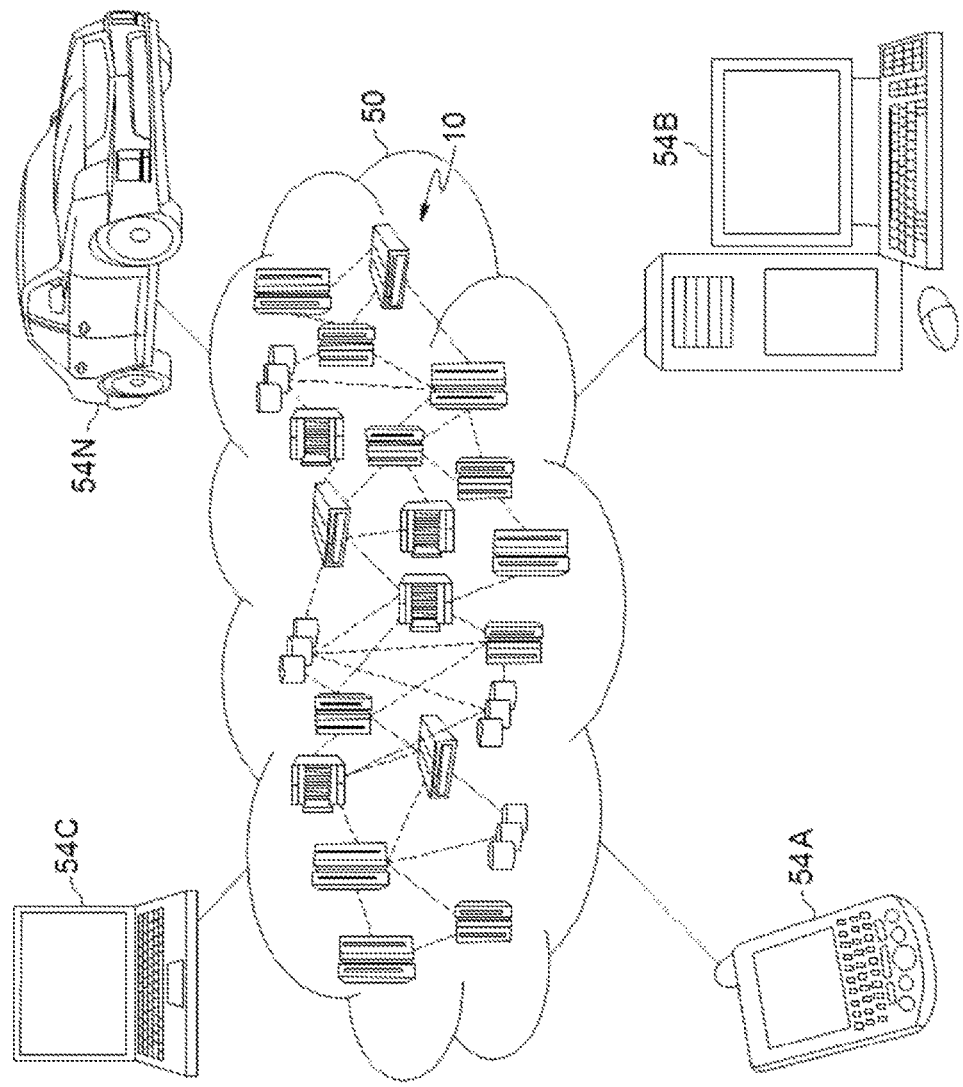
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
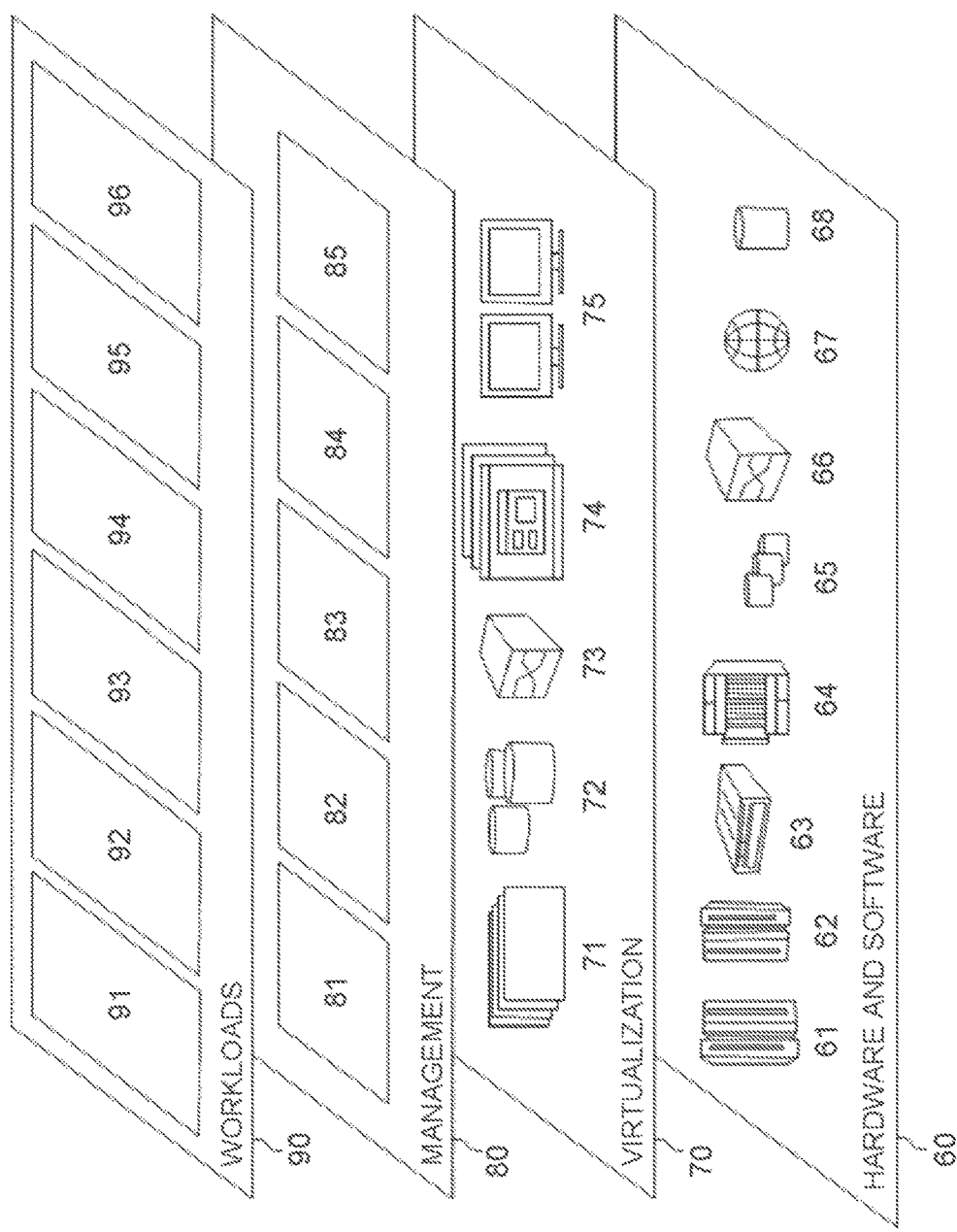
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and customizing mirror virtual machines 96 as described herein.

Figure 4:
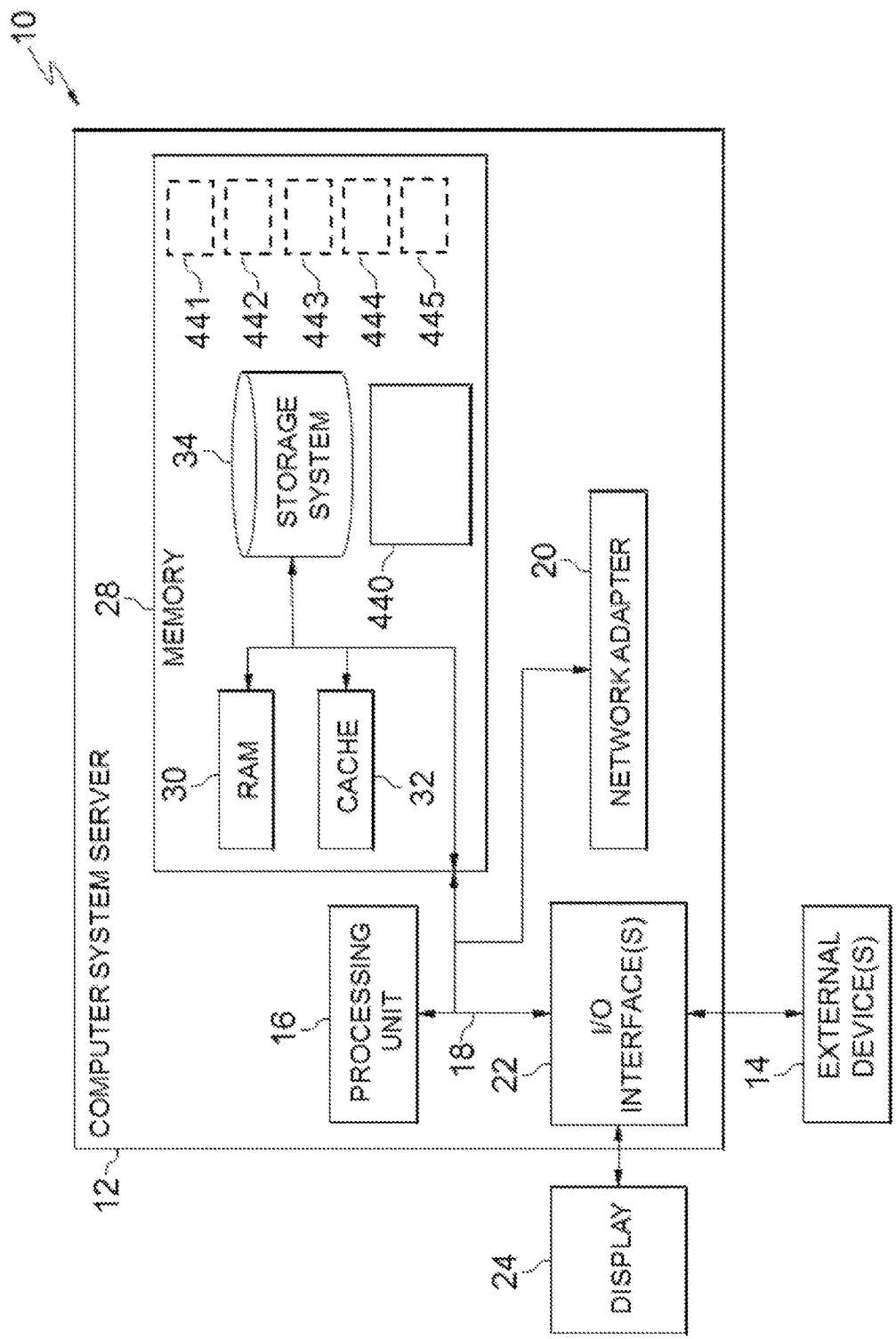
FIG. 4 depicts a hardware overview of a computing node, in accordance with one or more aspects set forth herein.

FIG. 4 depicts a hardware overview of a computing node 10, which may be a cloud computing node, in accordance with one or more aspects set forth herein. By way of example, computing node 10 may generally be any of the computing devices described herein, such as network devices, client computers, server computers, etc.

Program/utility 40 as set forth in FIG. 1 can include one or more program 440 as set forth in FIG. 4, and program/utility 40 as set forth in FIG. 1 can optionally include some or all of one or more program 441, 442, 443, 444, 445.

One or more program 440 can have a set (at least one) of program modules, and may be stored in memory 28 by way of example, and not limitation, as well as an operating system, one or more application programs, other program modules, and program data. Each of the operating system, one or more application programs, other program modules, program data, and one or more program, or some combination thereof, may include an implementation of a networking environment. One or more program 440 (and optionally at least one of one or more program 441, 442, 443, 444, 445) generally carry out the functions and/or methodologies of embodiments of the invention as described herein, such as customizing mirror virtual machines 96.

Referring again to FIG. 4:

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 5:
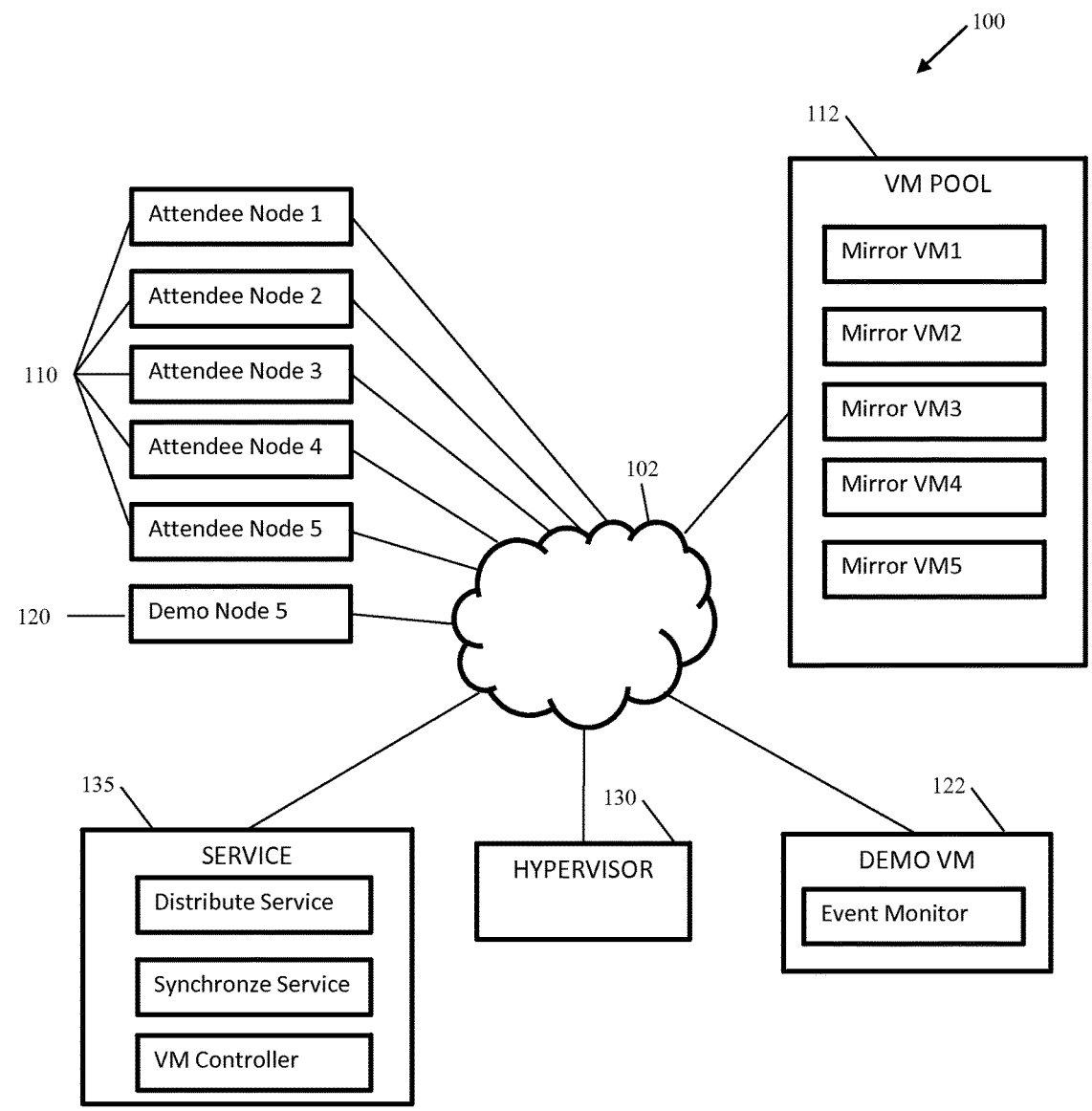
FIG. 5 is an exemplary block diagram of a system, in accordance with one or more aspects set forth herein.

FIG. 5 is an exemplary block diagram of a system 100, in accordance with one or more aspects set forth herein. In the embodiment of FIG. 5, system 100 includes numerous devices, which may be or include computing nodes 10 as previously described, connected by a network 102. For example, network 102 may be a physical network or a virtual network. A physical network can be, for example, a physical telecommunications network connecting numerous computer nodes or systems, such as computer servers and computer clients. By contrast a virtual network can, for example, combine numerous physical networks or parts thereof into a logical virtual network. In another example, numerous virtual networks can be defined over a single physical network.

By way of explanation, FIG. 5 depicts an example environment in which numerous attendees of an educational training or demonstration (demo) use attendee nodes 110 (e.g., computing nodes) to participate in the training or demonstration. In one or more embodiments, a demonstrator or trainer makes use of a demonstration (demo) node 120 to control a demonstration (demo) virtual machine (VM).

For instance, a demonstration can begin, with network 102 allowing connection of attendee nodes 110 to receive output of demonstration VM 122. In such a case, all attendees may initially follow along in the demonstration as conducted by a demonstrator via input entered at demonstration node 120 controlling software running on demonstration virtual machine 122.

In addition, a service VM 135 (e.g., a virtual machine controller) and a hypervisor 130 may be used to monitor, create, delete, and manage virtual machines running on one or more host computers. For example, a virtual machine (VM) pool may include one or more computing nodes or hosts running one or more mirror virtual machines 112.

Further, during operation of system 100, service VM 135 may be used to allow attendees to get customized mirror virtual machines to have individual training experiences, as explained in further detail herein.

Figure 6:
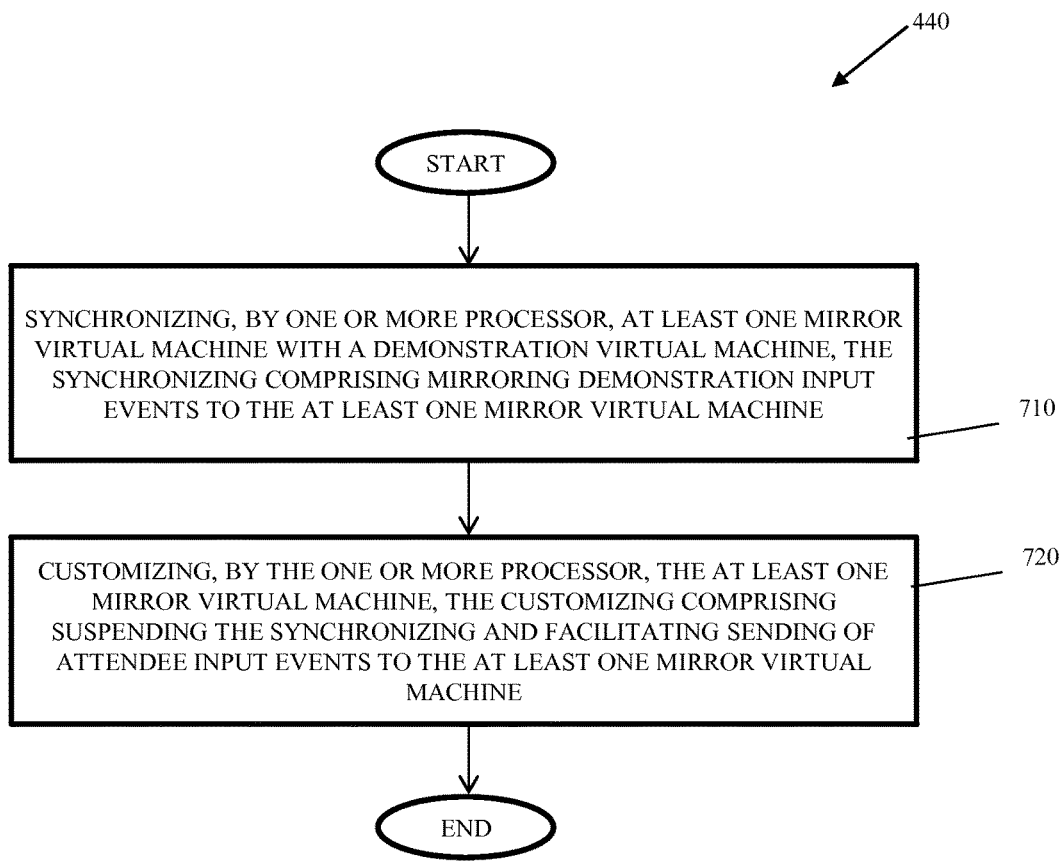
FIG. 6 depicts one or more embodiments of a process for customizing mirror virtual machines, in accordance with one or more aspects set forth herein.

FIG. 6 depicts embodiments of a process for customizing mirror virtual machines, in accordance with one or more aspects set forth herein. By way of example, the processes described with respect to FIG. 6 can be performed using one or more program 440 on one or more device 125 (FIG. 5), as detailed with respect to FIG. 4.

In the embodiment of FIG. 6, one or more program 440 at block 710 synchronizes at least one mirror virtual machine with a demonstration virtual machine, the synchronizing comprising mirroring demonstration input events to the at least one mirror virtual machine; and one or more program 440 at block 720 customizes the at least one mirror virtual machine, the customizing comprising suspending the synchronizing and facilitating sending of attendee input events to the at least one mirror virtual machine.

In one embodiment, one or more program 440 at block 710 clones the demonstration virtual machine to create the at least one mirror virtual machine, the cloning comprising initializing the at least one mirror virtual machine, and copying demonstration virtual machine state information to the at least one mirror virtual machine.

In another embodiment, one or more program 440 at block 720 decrements an available mirror virtual machine counter, and one or more program 440 at block 710 clones the demonstration virtual machine to create another mirror virtual machine responsive to the available mirror virtual machine counter having a certain value.

In a further embodiment, one or more program 440 at block 710 records the demonstration input events from a demonstration computing node, the demonstration computing node being connected to the demonstration virtual machine.

In one embodiment, one or more program 440 at block 720 receives an attendee customization request from an attendee computing node connected to the mirror virtual machine, one or more program 440 at block 720 stops connection of the attendee computing node and the demonstration virtual machine, and one or more program 440 at block 720 facilitates connection of the attendee computing node and the at least one mirror virtual machine. In such a case, for example, one or more program 440 at block 720 facilitates connection of the attendee computing node and the demonstration virtual machine responsive to an attendee drop request, and one or more program 440 at block 720 deletes the at least one mirror virtual machine.

In another embodiment, one or more program 440 at block 720 facilitates sending at least keyboard input or mouse input from the attendee computing node to the at least one mirror virtual machine. For example, such a technique may allow the attendee control the mirror virtual machine(s) and support the attendee's individual operations.

In a further embodiment, one or more program 440 at block 710 mirrors at least keyboard input or mouse input received by the demonstration virtual machine from a demonstration computing node to the at least one mirror virtual machine to facilitate mirror virtual machine state information being synchronized with demonstration virtual machine state information.

In one embodiment, one or more program 440 at block 710 mirrors operating system events or application events of the demonstration virtual machine to the at least one mirror virtual machine to facilitate mirror virtual machine state information being synchronized with demonstration virtual machine state information.

In another embodiment, one or more program 440 at block 710 updates an operating system or an application running on the at least one mirror virtual machine with the operating system or application events of the demonstrator virtual machine.

In one or more embodiments, one or more program 440 at block 710 creates a live snapshot of a running demonstration virtual machine, begins recording demonstrator events from the moment of the live snapshot, and clones a demonstrator virtual machine. In such a case, one or more program 440 at block 710 may clone the demonstrator virtual machine by copying state information from the live snapshot to a clone virtual machine (i.e., a mirror virtual machine) and then after the copying, feeding the recorded demonstrator events to the mirror virtual machine to ensure synchronization of state. In one example, a fast clone may take approximately 1-2 minutes to launch, because the fast clone may require a specific operating system and application load to be retrieved by a hypervisor, host computing resources to be allocated, and the operating system and application load to be launched, before state information can be copied.

In other embodiments, an overlay VXLAN may be used to isolate mirror virtual machines from a demonstrator virtual machine, helping to synchronize keyboard and mouse events, including network and hostname related operations. In a further example, high-availability or load balancing demonstrations can be conducted, and instead of a single demonstration virtual machine, a set of multiple demonstration virtual machines can be mirrored.

FIGS. 7A-7D are diagrams illustrating further aspects of a process for customizing mirror virtual machines, in accordance with one or more aspects set forth herein. By way of explanation, in FIGS. 7A-7D, processes are illustrated from the point of view of a service one or more program 440 (e.g., running on service VM 135 of FIG. 5), demonstration (demo) node one or more program 441 (e.g., running on demo node 120 of FIG. 5), a demonstration (demo) virtual machine (VM) one or more program 442 (e.g., running on demo VM 122 of FIG. 5), mirror virtual machine one or more program 443 (e.g., running on mirror VM1 of FIG. 5), mirror virtual machine one or more program 444 (e.g., running on mirror VM2 of FIG. 5), attendee node one or more program 445 (e.g., running on attendee node 1 of FIG. 5), and attendee node one or more program 446 (e.g., running on attendee node 2 of FIG. 5). In addition, one or more program 440 at block 710 (FIG. 6) synchronizing at least one virtual machine can include one or more program 440-446 performing one or more of blocks 710a-710j (FIGS. 7A-7D). Further, one or more program 440 at block 720 (FIG. 6) customizing at least one virtual machine can include one or more program 440-446 performing one or more of blocks 720a-720j (FIGS. 7A-7D).

In one or more embodiments, some or all of the programs 440-446 may run on a different collection of physical or virtual machines or processors, depending on the need for scalability of the system. In one specific example, all of the mirror virtual machines could run on a single multi-processor server system. In another specific example, various portions of service one or more program 440 may run on different processors running on different computing nodes, in order to support a large system with multiple simultaneous demonstrators each serving a different pool of attendees.

Figure 7A:
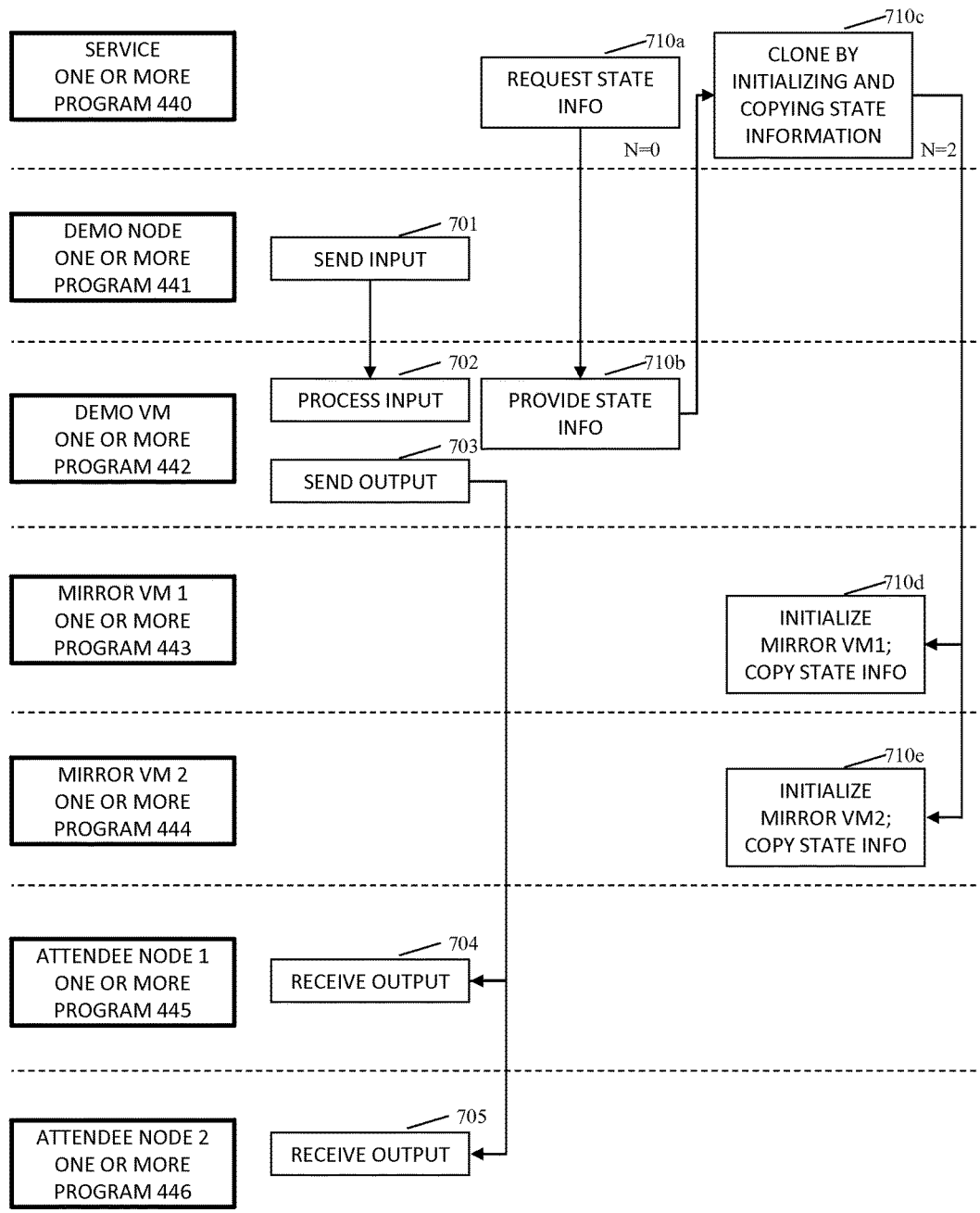
FIGS. 7A-7D are diagrams illustrating further aspects of a process for customizing mirror virtual machines, in accordance with one or more aspects set forth herein.
Figure 7B:
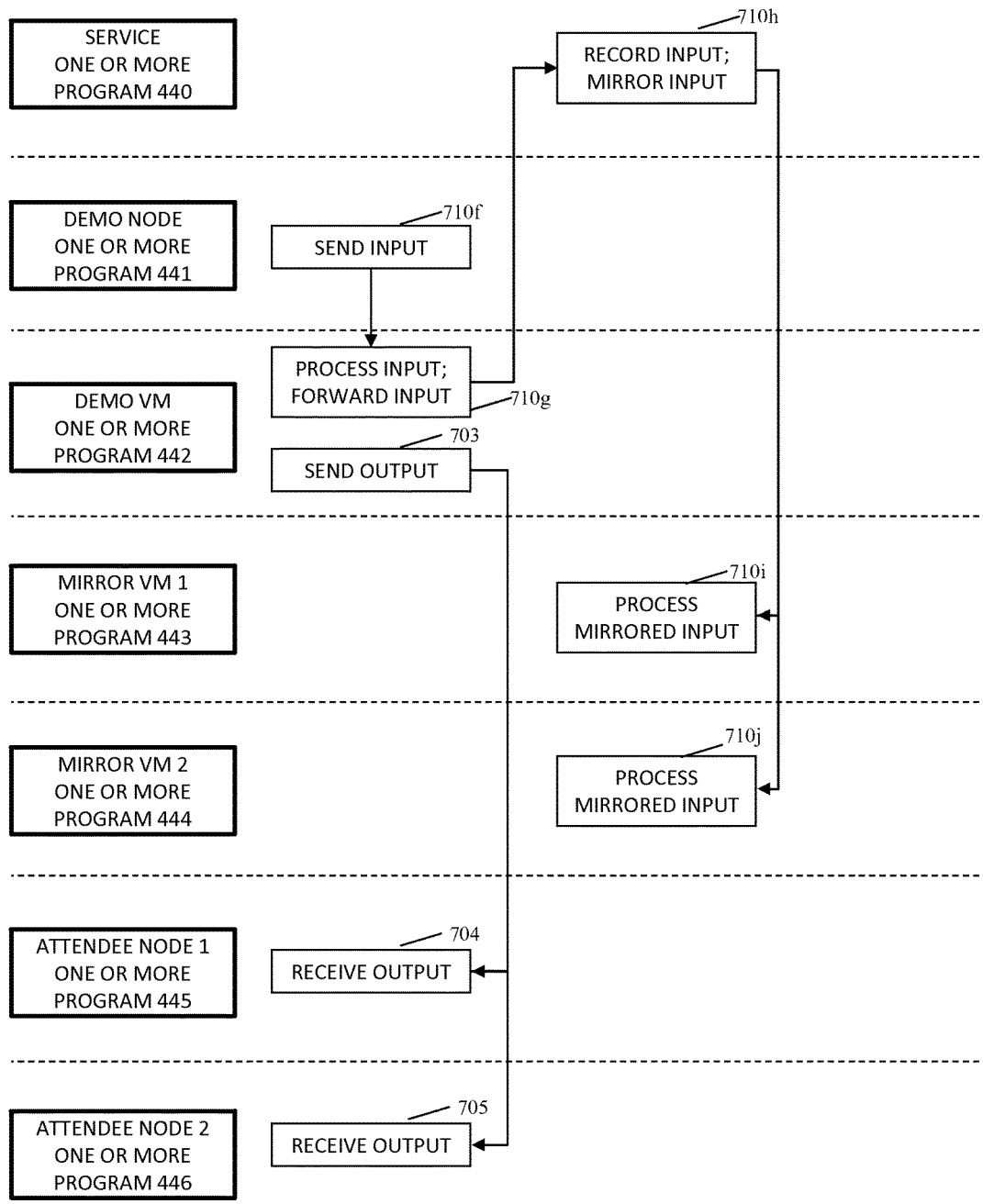
Figure 7C:
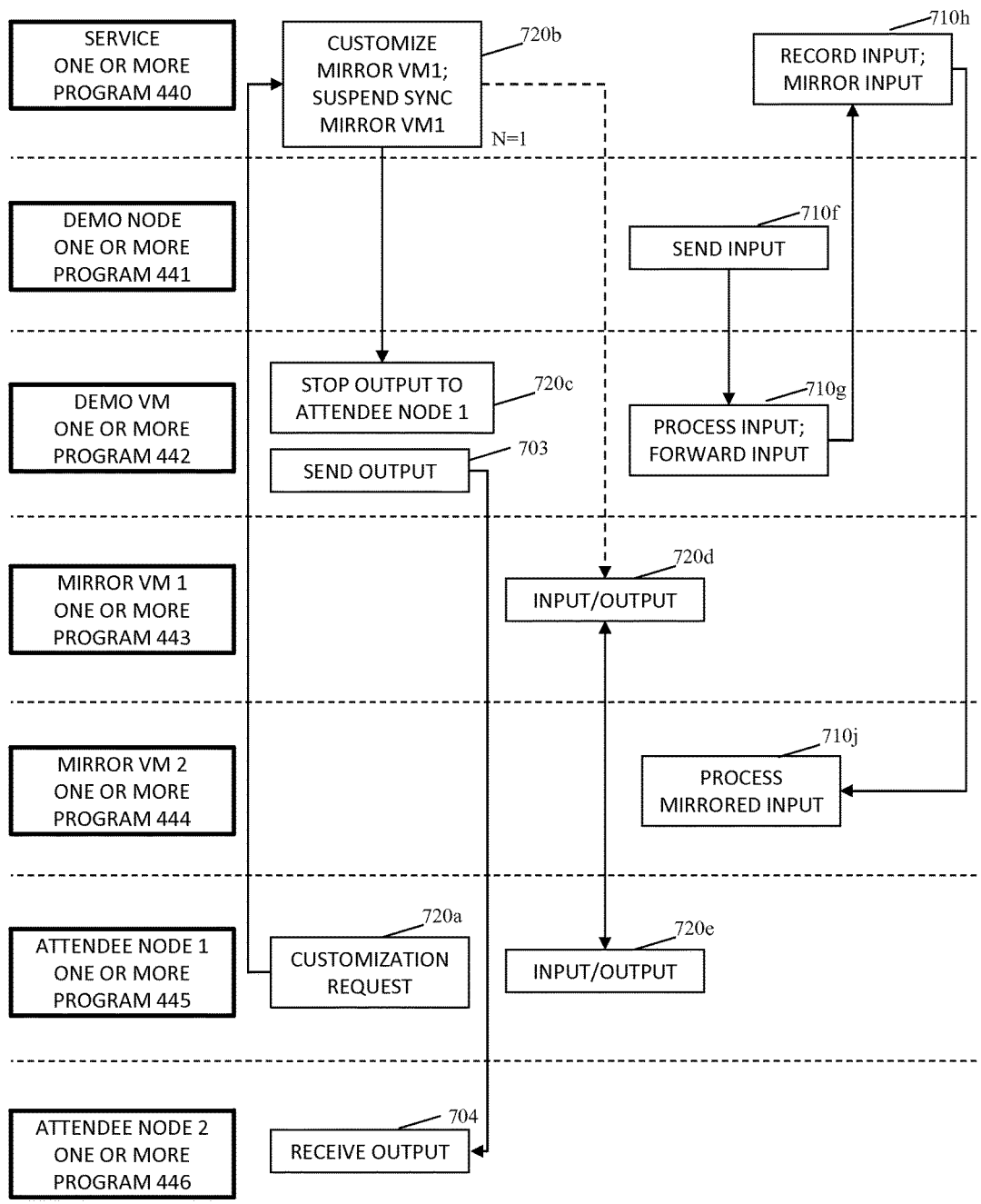
Figure 7D:
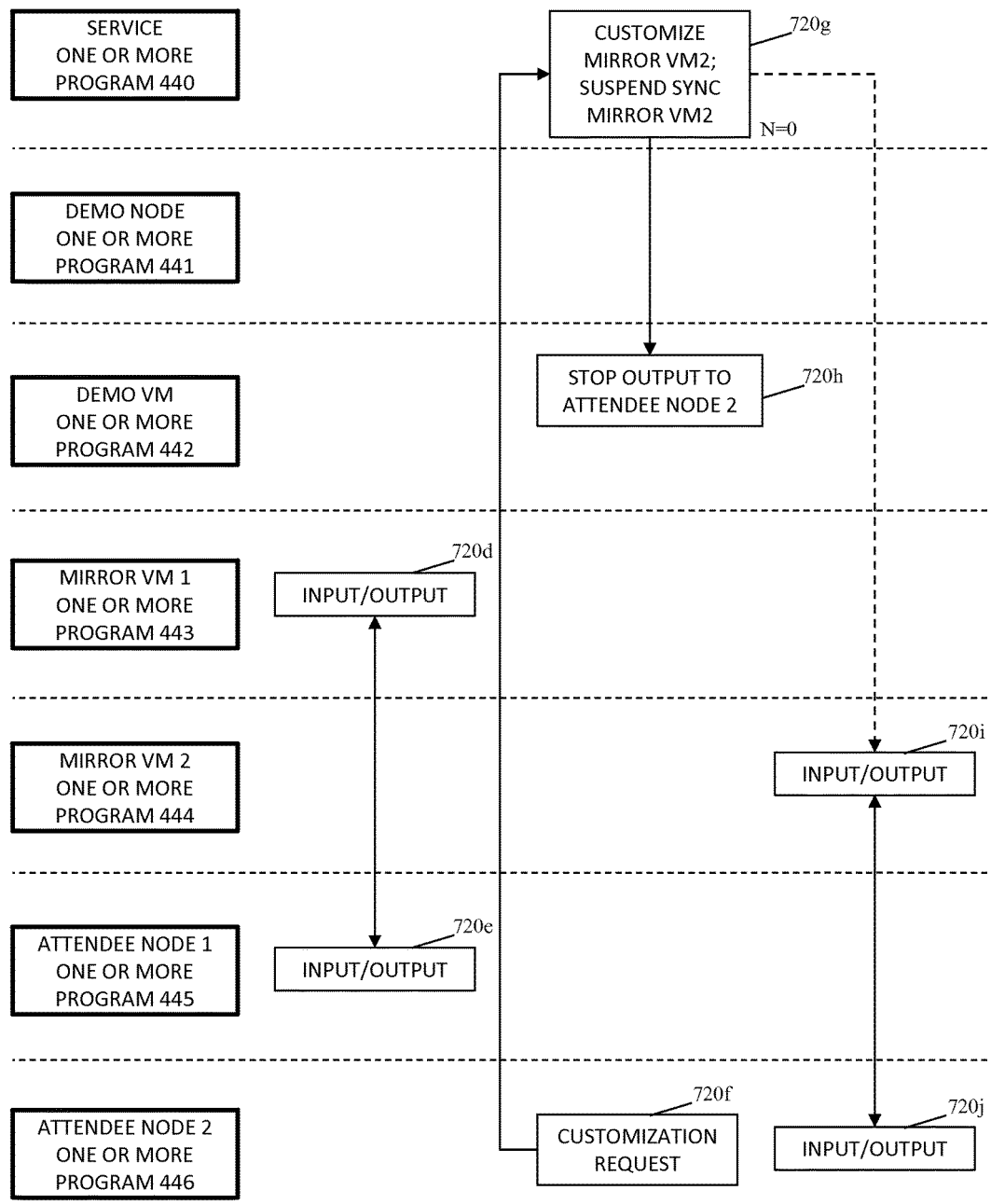

By way of overview, FIG. 7A illustrates, at least in part, aspects of the present disclosure in which multiple attendees may follow along with a demonstration, as well as mirror virtual machines being synchronized by, for example, cloning. In addition, FIG. 7B illustrates, at least in part, synchronization of mirror virtual machines by mirroring input events. Further, FIG. 7C illustrates, at least in part, customizing a first mirror virtual machine for a first attendee, showing a demonstration virtual machine for a second attendee, and synchronizing a second mirror virtual machine. In addition, FIG. 7D illustrates, at least in part, individually customizing the first and second mirror virtual machines for the first and second attendees. In one or more embodiments, such processes may be expanded to include more mirror virtual machines, to support simultaneous pools of attendees each participating in one or more different demonstrations.

With reference to FIG. 7A, in one embodiment, demonstration node one or more program 441 at block 701 sends input, such as keyboard and/or mouse input, for example, generated by a demonstrator operating demonstration node 120 (FIG. 5). In one example, demonstration VM one or more program 442 at block 702 processes the input, for example, by enabling control of demonstration virtual machine 122 (FIG. 5).

In one or more embodiments, for example in which two attendees are attending a demonstration, and are simply following along viewing rather than interacting, demonstration virtual machine one or more program 442 at block 703 sends output of the demonstration virtual machine, such output including one or more of visual, audio, printing, video, etc., to the attendee nodes.

By way of example, attendee node 1 one or more program 445 at block 704 receives the output of the demonstration virtual machine, and attendee node 2 one or more program 446 at block 705 also receives the output of the demonstration virtual machine. During the course of the demonstration, blocks 701-705 may repeat numerous times, allowing the attendees to follow along with the demonstration, for example as passive observers.

In another embodiment, service one or more program 440 at block 710a begins a synchronizing process, and requests demonstration virtual machine state information. For example, service one or more program 440 can begin a cloning process responsive to an available mirror virtual machine counter N reaching a certain value, such as N=0. In response, demonstration virtual machine one or more program 442 at block 710b provides the demonstration virtual machine state information to the service virtual machine. For example, state information can include information regarding each running operating system or component thereof, applications, utilities, and other programs, along with information as to what files may be loaded, etc. In another example, state information may include hibernation data of the demonstration virtual machine that can be used to enable the virtual machine to temporarily shut down and reboot later with the same state. In a further example, state information may include keyboard and mouse, or any other input, information.

In one embodiment, service one or more program 440 at block 710c creates two clones of the demonstration virtual machine by initializing mirror virtual machine 1 (VM1) and mirror virtual machine 2 (VM2), copying the obtained demonstration virtual machine state information to the mirror virtual machines, and setting N=2. In particular, mirror VM1 one or more program 443 at block 710d initializes mirror VM1 and copies the obtained virtual machine state information to mirror VM1. In addition, mirror VM2 one or more program 444 at block 710e initializes VM2 and copies the obtained virtual machine state information to mirror VM2. In such a manner, two mirror virtual machines may be created. In another example, multiple mirror virtual machines may be created on the same host computing node, rather than on separate computing nodes, depending on the performance requirements of the virtual machines.

With reference to FIG. 7B, in one or more embodiments, demonstration node one or more program 441 at block 710f sends input to a demonstration virtual machine. For instance, demonstration virtual machine one or more program 442 at block 710g processes the input as before, but now also forwards the input to the service node. In one example, demonstration virtual machine one or more program 442 may include an event monitor, and the event monitor may have been commanded by the service node to forward input to service one or more program 440. In such an example, service one or more program 440 at block 710h may record the demonstration input events that were received from the demonstration node, and proceed to mirror such demonstration input events to the mirror virtual machines. For example, the input may include keyboard and/or mouse input, or operating system or application events. In one example, the demonstration node can send such events in real-time to the service node. In another example, the events may be collected and sent in a batch mode to the service node.

In one or more embodiments, mirror VM1 one or more program 443 at block 710i, and/or mirror VM2 one or more program 444 at block 710j receive the mirrored input sent by the service node, and process the received input to facilitate keeping the mirror virtual machines in synchronization with the demonstration virtual machine. In one example, the events may include keystrokes or mouse movements that lead to launching of programs. In another example, the events may be internally generated operating system events that are replicated and/or mirrored to the synchronized mirror virtual machines.

With reference to FIG. 7C, in one or more embodiments, attendee node 1 one or more program 445 at block 720a sends an attendee customization request to the service node. Such a request may be sent when an attendee, who has been following along the demonstration, decides to embark upon an individualized experience during the training, and desires to start the individualized experience by branching off from the demonstration at a particular moment. In such an example, in one embodiment, service node one or more program 440 at block 720*b* in turn sends the attendee customization request to the demonstration virtual machine.

In one embodiment, demonstration virtual machine one or more program 442 at block 720*c* stops connection of the attendee computing node and the demonstration virtual machine, so that the attendee no longer receives the output of the demonstration virtual machine. In addition, service node one or more program 440 at block 720*b* decrements the available mirror virtual machine counter to N=1, and facilitates connection of mirror virtual machine VM 1 and attendee node 1. Further, service node one or more program 440 at block 720*b* suspends synchronizing mirror virtual machine 1 and the demonstration virtual machine.

In one embodiment, for instance, mirror VM1 one or more program 443 at block 720*d* receives a message from the service node, and begins connecting its input and output to the output and input, respectively, of attendee node 1. Similarly, attendee node 1 one or more program 445 at block 720*e* begins connecting its output and input to the input and output, respectively of mirror VM1. In such a manner, mirror virtual machine 1 is customized, and can offer an individualized training experience to the attendee who is operating attendee node 1. In another example, after the attendee finishes individualized training, the attendee may send a drop request to the service node and resume receiving the output of the demonstration virtual machine. In addition, the attendee can decide to once again branch off for an individualized training experience, and be connected to another mirror virtual machine. Simultaneously with attendee 1 receiving a customized training experience, attendee 2 can continue to benefit from the shared training from the demonstration virtual machine, through execution of blocks 710*f-h*, 710*j*.

With respect to FIG. 7D, in one or more embodiments, mirror VM2 one or more program 446 at block 720*f* sends an attendee customization request to the service node. In such an example, in one embodiment, service node one or more program 440 at block 720*g* in turn sends the attendee customization request to the demonstration virtual machine. In one embodiment, demonstration virtual machine one or more program 442 at block 720*h* stops connection of the attendee computing node and the demonstration virtual machine, so that the attendee no longer receives the output of the demonstration virtual machine. In addition, service node one or more program 440 at block 720*g* decrements the available mirror virtual machine counter to N=0, and facilitates connection of mirror virtual machine VM2 and attendee node 2. Further, service node one or more program 440 at block 720*g* suspends synchronizing mirror virtual machine 2 and the demonstration virtual machine.

In one embodiment, for instance, mirror VM2 one or more program 444 at block 720*i* receives a message from the service node, and begins connecting its input and output to the output and input, respectively, of attendee node 2. Similarly, attendee node 2 one or more program 446 at block 720*j* begins connecting its output and input to the input and output, respectively of mirror VM2. In such a manner, mirror virtual machine 2 is customized, and can offer an individualized training experience to the attendee who is operating attendee node 2. Simultaneously, both attendees 1, 2, may receive customized training experiences. In one embodiment, service one or more program 440 at block 720*g*, responsive to N=0, can clone another mirror virtual machine to facilitate further customization by the attendees.

In one or more embodiments, a cloud computing network for supporting the techniques described herein may include multiple remote locations, which are connected via a layer 2 and/or layer 3 network. For instance, a first remote location may include two host computing nodes, e.g., host A and host B, and a second remote location may include one host computing node, e.g., host C. For example, host A and host B may be connected to a first virtual or overlay network, and host C may be connected to a second virtual or overlay network. Each of the virtual or overlay networks may be connected to the layer 2 and/or layer 3 network, which may in turn be connected to a public internet.

In a further example, host A may host two demonstrator virtual machines VM1 and VM1'. In such a case, host B may host two mirror virtual machines, each of which mirrors VM1 and VM1' respectively. Further, host C may host two more mirror virtual machines, each of which also mirrors VM1 and VM1' respectively. In such a manner, mirror virtual machines may be efficiently hosted in a geographically dispersed configuration to facilitate large scale deployments of the techniques described herein.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A method comprising:
synchronizing, by one or more processor, at least one first virtual machine with a second virtual machine, the synchronizing comprising mirroring first input events from the second virtual machine to the at least one first virtual machine; and customizing, by the one or more processor, the at least one first virtual machine, the customizing comprising suspending the synchronizing and facilitating sending of second input events to the at least one first virtual machine, wherein the synchronizing the at least one first virtual machine with a second virtual machine includes synchronizing first and second first virtual machines VM1 and VM2 to the second virtual machine, and wherein the customizing includes (a) with a first user computing node of a first user connected to the second virtual machine and a second user computing node of a second user connected to the second virtual machine receiving a first customization request from the first user computing node initiated by the first user; (b) responsively to the first customization request and concurrently while VM2 remains synchronized to the second virtual machine suspending the synchronizing between the second virtual machine and VM1 and initiating sending input events of the second input events to VM1; (c) with the first user computing node of a first user connected to VM1 and with the second user computing node of a second user remaining connected to the second virtual machine receiving a second customization request from the second user computing node initiated by the second user; and (d) responsively to the second customization request suspending the synchronizing between the second virtual machine and VM2, connecting the second user computing node to VM2 and initiating sending input events of the second input events from the second user computing node to VM2.

2. The method of claim 1, wherein the synchronizing comprises cloning the second virtual machine to create the at least one first virtual machine, the cloning comprising initializing the at least one first virtual machine, and copying second virtual machine state information to the at least one first virtual machine.

3. The method of claim 1, wherein the customizing comprises decrementing a counter, and the synchronizing comprises cloning the second virtual machine to create another virtual machine responsive to the counter having a certain value.

4. The method of claim 1, wherein the synchronizing comprises recording the first input events from a computing node, the computing node being connected to the second virtual machine.

5. The method of claim 1, wherein the customizing comprises receiving a customization request from a computing node connected to the second virtual machine, stopping connection of the computing node and the second virtual machine, and facilitating connection of the computing node and the at least one first virtual machine.

6. The method of claim 5, wherein the customizing further comprises facilitating connection of the computing node and the second virtual machine responsive to a drop request, and deleting the at least one first virtual machine.

7. The method of claim 5, wherein the customizing comprises facilitating sending at least keyboard input or mouse input from the computing node to the at least one first virtual machine.

8. The method of claim 1, wherein the synchronizing comprises mirroring at least keyboard input or mouse input received by the second virtual machine from a computing node to the at least one first virtual machine.

9. The method of claim 1, wherein the synchronizing comprises mirroring operating system events or application events of the second virtual machine to the at least one first virtual machine.

10. The method of claim 9, wherein the synchronizing further comprises updating an operating system or an application running on the at least one first virtual machine with the operating system or application events of the second virtual machine.

11. A computer program product comprising:
a computer readable storage medium readable by one or more processor and storing instructions for execution by the one or more processor for performing a method comprising:
synchronizing, by one or more processor, at least one first virtual machine with a second virtual machine, the synchronizing comprising mirroring first input events to the at least one first virtual machine; and
customizing, by the one or more processor, the at least one first virtual machine, the customizing comprising suspending the synchronizing, and facilitating sending of second input events to the at least one first virtual machine, wherein the synchronizing the at least one first virtual machine with a second virtual machine includes synchronizing first and second first virtual machines VM1 and VM2 to the second virtual machine, and wherein the customizing includes (a) with a first user computing node of a first user connected to the second virtual machine and a second user computing node of a second user connected to the second virtual machine receiving a first customization request from the first user computing node initiated by the first user; (b) responsively to the first customization request and concurrently while VM2 remains synchronized to the second virtual machine suspending the synchronizing between the second virtual machine and VM1 and initiating sending input events of the second input events to VM1; (c) with the first user computing node of a first user connected to VM1 and with the second user computing node of a second user remaining connected to the second virtual machine receiving a second customization request from the second user computing node initiated by the second user; and (d) responsively to the second customization request suspending the synchronizing between the second virtual machine and VM2, connecting the second user computing node to VM2 and initiating sending input events of the second input events from the second user computing node to VM2.

12. The computer program product of claim 11, wherein the synchronizing comprises cloning the second virtual machine to create the at least one first virtual machine, the cloning comprising initializing the at least one first virtual machine, and copying second virtual machine state information to the at least one first virtual machine.

13. The computer program product of claim 11, wherein the customizing comprises decrementing a counter, and the synchronizing comprises cloning the second virtual machine to create another first virtual machine responsive to an available first virtual machine counter having a certain value.

14. The computer program product of claim 11, wherein the synchronizing comprises recording the first input events from a computing node, the computing node being connected to the second virtual machine.

15. The computer program product of claim 11, wherein the customizing comprises facilitating connection of a computing node and the at least one first virtual machine responsive to a customization request.

16. A system comprising:
a memory;
one or more processor in communication with the memory; and
program instructions executable by the one or more processor via the memory to perform a method, the method comprising:
synchronizing, by one or more processor, at least one first virtual machine with a second virtual machine, the synchronizing comprising mirroring first input events from the second virtual machine to the at least one first virtual machine; and
customizing, by the one or more processor, the at least one first virtual machine, the customizing comprising suspending the synchronizing and facilitating sending of second input events to the at least one first virtual machine, wherein the synchronizing the at least one first virtual machine with a second virtual machine includes synchronizing first and second first virtual machines VM1 and VM2 to the second virtual machine, and wherein the customizing includes (a) with a first user computing node of a first user connected to the second virtual machine and a second user computing node of a second user connected to the second virtual machine receiving a first customization request from the first user computing node initiated by the first user, (b) responsively to the first customization request and concurrently while VM2 remains synchronized to the second virtual machine suspending the synchronizing between the second virtual machine and VM1 and initiates sending input events of the second input events to VML (c) with the first user computing node of a first user connected to VM1 and with the second user computing node of a second user remaining connected to the second virtual machine receiving a second customization request from the second user computing node initiated b the second user: and (d) responsively to the second customization request suspending the synchronizing between the second virtual machine and VM2, connecting the second user computing node to VM2 and initiating sending input events of the second input events from the second user computing node to VM2.

17. The method of claim 1, wherein the synchronizing the at least one first virtual machine with a second virtual machine includes synchronizing first and second first virtual machines VM1 and VM2 to the second virtual machine, and wherein the customizing includes (a) with a first user computing node of a first user connected to the second virtual machine and a second user computing node of a second user connected to the second virtual machine receiving a first customization request from the first user computing node initiated by the first user; and (b) responsively to the first customization request and concurrently while VM2 remains synchronized to the second virtual machine suspending the synchronizing between the second virtual machine and VM1, connecting the first user computing node to VM1 and initiating sending input events of the second input events from the first computing node to VM1.

18. The method of claim 1, wherein the synchronizing the at least one first virtual machine with a second virtual machine includes synchronizing first and second first virtual machines VM1 and VM2 to the second virtual machine, wherein the second virtual machine is a training demonstration virtual machine for facilitating training of users and wherein the customizing includes (a) with a first user computing node of a first user connected to the second virtual machine and a second user computing node of a second user connected to the second virtual machine receiving a first customization request from the first user computing node initiated by the first user; and (b) responsively to the first customization request and concurrently while VM2 remains synchronized to the second virtual machine suspending the synchronizing between the second virtual machine and VM1, connecting the first user computing node to VM1 and initiating sending input events of the second input events from the first computing node to VM1.

19. The method of claim 1, wherein the method includes responsively to the suspending determining whether there are any available virtual machines synchronized to the second virtual machine and based on the determination that there are zero available virtual machines synchronized to the second virtual machine, cloning a mirror virtual machine of the second virtual machine.

20. The method of claim 1, wherein the second events include user initiated events sent from a user computing node connected to the at least one first virtual machine.

* * * * *